(12) United States Patent
Shan et al.

(10) Patent No.: US 12,226,951 B2
(45) Date of Patent: Feb. 18, 2025

(54) FDM 3D PRINTING OF OPTICAL LENS WITH HIGH CLARITY AND MECHANICAL STRENGTH

(71) Applicant: Essilor International, Charenton-le-Pont (FR)

(72) Inventors: Haifeng Shan, Shrewsbury, MA (US); Hao-Wen Chiu, Holden, MA (US); Aref Jallouli, Shrewsbury, MA (US)

(73) Assignee: Essilor International, Charenton-le-Pont (FR)

( * ) Notice: Subject to any disclaimer, the term of this patent is extended or adjusted under 35 U.S.C. 154(b) by 161 days.

(21) Appl. No.: 17/623,684

(22) PCT Filed: Jul. 1, 2020

(86) PCT No.: PCT/EP2020/068457
§ 371 (c)(1),
(2) Date: Dec. 29, 2021

(87) PCT Pub. No.: WO2021/001398
PCT Pub. Date: Jan. 7, 2021

(65) Prior Publication Data
US 2022/0274318 A1    Sep. 1, 2022

(30) Foreign Application Priority Data

Jul. 2, 2019 (EP) .................................. 19315055

(51) Int. Cl.
*B29C 64/118* (2017.01)
*B29C 64/314* (2017.01)
(Continued)

(52) U.S. Cl.
CPC .......... *B29C 64/118* (2017.08); *B29C 64/314* (2017.08); *B33Y 10/00* (2014.12);
(Continued)

(58) Field of Classification Search
CPC ..... B29C 64/118; B29C 64/314; B33Y 10/00; B29K 2101/12; B29K 2995/0082; B29K 2995/0097; B29L 2011/0016
(Continued)

(56) References Cited

U.S. PATENT DOCUMENTS

| 6,220,703 B1 | 4/2001 | Evans et al. |
| 2004/0125335 A1 | 7/2004 | Vu |

(Continued)

FOREIGN PATENT DOCUMENTS

| CN | 104054017 | 9/2014 |
| EP | 0226020 | 6/1987 |

(Continued)

OTHER PUBLICATIONS

Askadskii et al, "Prediction of the Compatibility of Polymers and Analysis of the Microphase Compositions and Some Properties of Blends", Polymer Science, vol. 52, No. 2, (2015), pp. 186-199.

(Continued)

*Primary Examiner* — Jeffrey M Wollschlager
*Assistant Examiner* — Xue H Liu
(74) *Attorney, Agent, or Firm* — Norton Rose Fulbright US LLP

(57) ABSTRACT

The disclosure includes core-shell filament composition for additive manufacturing of ophthalmic lenses and ophthalmic lens components. The disclosure also includes a set of criteria for selecting core and shell thermoplastic combinations that exhibit high optical clarity, improved filament inter-strand diffusion, high inter-strand adhesion, and improved manufactured part strength when used in an additive manufacturing method like fused deposition modelling.

7 Claims, 2 Drawing Sheets

(51) Int. Cl.
    *B33Y 10/00*     (2015.01)
    *B33Y 70/00*     (2020.01)
    *B29K 101/12*        (2006.01)
    *B29L 11/00*         (2006.01)
    *B33Y 80/00*         (2015.01)

(52) U.S. Cl.
    CPC .......... *B33Y 70/00* (2014.12); *B29K 2101/12* (2013.01); *B29K 2995/0082* (2013.01); *B29K 2995/0097* (2013.01); *B29L 2011/0016* (2013.01); *B33Y 80/00* (2014.12)

(58) Field of Classification Search
    USPC .......................................................... 264/308
    See application file for complete search history.

(56) References Cited

U.S. PATENT DOCUMENTS

| | | | |
|---|---|---|---|
| 2007/0138664 | A1 | 6/2007 | Chen et al. |
| 2007/0202265 | A1 | 8/2007 | Berzon |
| 2008/0246187 | A1* | 10/2008 | Chiu ........................ G02B 1/043 |
| | | | 528/502 R |
| 2009/0273756 | A1 | 11/2009 | Vu |
| 2013/0329184 | A1 | 12/2013 | Barzak et al. |
| 2017/0322344 | A1 | 11/2017 | Yoshida et al. |
| 2019/0243161 | A1 | 8/2019 | Gloge et al. |

FOREIGN PATENT DOCUMENTS

| | | | | |
|---|---|---|---|---|
| EP | 3222420 | | 9/2017 | |
| EP | 3312662 | | 4/2018 | |
| EP | 3437845 | | 6/2019 | |
| EP | 3579044 | A1 * | 12/2019 | .......... B29C 64/129 |
| KR | 20200130861 | | 11/2020 | |
| WO | WO2018/224395 | | 12/2018 | |
| WO | WO2021/001399 | | 1/2021 | |
| WO | WO2021/001403 | | 1/2021 | |

OTHER PUBLICATIONS

ASTM D790-03—"Standard Test Methods for Flexural Properties of Unreinforced and Reinforced Plastics and Electrical Insulating Materials", (2003), pp. 1-11.

ASTM E1356-08—"Standard Test Method for Assignment of the Glass Transition Temperatures by Differential Scanning Calorimetry", (2014), pp. 1-4.

Backfolk et al, "Determination of the glass transition temperature of latex films: Comparison of various methods", Polymer Testing, Elsevier, Amsterdam, NL, vol. 26, No. 8, Nov. 14, 2007 (Nov. 14, 2007), p. 1031-1040.

International Search Report & Written Opinion issued in priority application PCT/EP2020/068457, dated Sep. 23, 2020.

International Search Report & Written Opinion issued in related application PCT/EP2020/068458, dated Sep. 1, 2020.

International Search Report & Written Opinion issued in related application PCT/EP2020/068463, dated Oct. 7, 2020.

Office Action issued in corresponding U.S. Appl. No. 17/623,692, dated Feb. 15, 2024.

Office Action issued in corresponding Chinese Application No. 2020800481946, dated Dec. 29, 2023.

* cited by examiner

FDM 3D PRINTING OF OPTICAL LENS WITH HIGH CLARITY AND MECHANICAL STRENGTH

CROSS-REFERENCE TO RELATED APPLICATIONS

This application is a national phase application under 35 U.S.C. § 371 of International Application No. PCT/EP2020/068457 filed 1 Jul. 2020, which claims priority to European Patent Application No. 19315055.4 filed 2 Jul. 2019. The entire contents of each of the above-referenced disclosures is specifically incorporated by reference herein without disclaimer.

FIELD OF THE INVENTION

The present invention generally relates to the fields of additive manufacturing and ophthalmic lenses.

BACKGROUND 3D printing represents an excellent technique for manufacturing low production volumes. 3D printing allows a small number of lenses to be produced for experiments and testing, without having to interrupt large-volume manufacturing processes.

Fused deposition modeling (FDM) is a 3D printing method that involves a repeated build-up of multiple layers of filament. FDM uses a continuous filament of a thermoplastic material that is fed through a heated printer extruder head and is deposited in multiple voxels to fabricate a part, e.g., a lens or a wafer. FDM works in conjunction with 3D printers and production-grade thermoplastics to build strong, durable, and dimensionally stable parts with the accuracy and reproducability of a computer-controlled manufacturing technique.

Optical lenses should exhibit high clarity and strength in order to be useful as daily-wear products. Application of fused deposition modeling to the field of optics has been limited by a number of factors. One major disadvantage of FDM 3D printing is its inability to manufacture parts at a resolution that is high enough for parts of optical quality. The FDM layering method involves the repeated application or build-up of multiple voxels of polymer filament material. The step-wise build-up process results in numerous multiple edges or small holes on the surface of the manufactured part. Each of the numerous edges provides an area through which light may be scattered. The net result is a manufactured part with a rough surface and non-transparent appearance that scatters light significantly. Another disadvantage of FDM 3D printing is that manufactured parts often exhibit poor mechanical strength and poor impact resistance due to poor inter-diffusion between adjacent voxels.

There is a need in the ophthalmic lens industry for improved 3D printing techniques to produce lenses having increased strength and acceptable optical clarity.

SUMMARY

In attempting to improve upon the inherent strength and clarity issues associated with FDM, the inventors examined a number of different methodologies, including manufacture of the filament material itself. The inventors found that using a bi-component, composite filament addressed some of the problems discussed above. The bi-component, composite filament is provided in a core-shell configuration, with the filament's core thermoplastic and shell thermoplastic meeting certain criteria. Selecting clear core and shell thermoplastics that have a refractive index difference of equal to or less than 0.1 provides a clear 3D-printed wafer that is of optical quality. Compatible core and shell thermoplastics may be selected to provide strong adhesion between deposited core and shell thermoplastic materials. In some embodiments, adhesion between core and shell materials is assessed by examining peel strength. The peel strength may be at least 100 g/25 mm, as determined by ASTM D1876-01. The peel strength measurement of the core-shell filament may be implemented as follows: a tension testing machine having suitable grips capable of clamping the core and shell of a composite filament shall be employed. The tension testing machine shall be autographic, providing a display or chart that can be read in terms of distance of separation, e.g., mm, as one coordinate and applied load, e.g., grams, as the other coordinate. The test specimen consists of two flexible adherends, e.g., filament core and filament shell, prepared and bonded together in accordance with the specimen's manufacture recommendations. Approximately 76 mm of test specimen core and shell are physically unbonded from each other and core and shell ends are each clamped to a grip of the testing machine. Machine load is applied at a constant head speed of 254 mm (10 in.)/minute. An autographic measurement of load versus head movement or load versus distance peeled is recorded. The peel strength is determined over at least a 127 mm (5 inch) length of bond line after initial peak. The average peel strength in grams per millimeter (or pounds per inch) of the specimen required to separate the adherends is determined from the autographic curve for the first 127 mm (5 in.) of peeling after the initial peak.

Selecting a core thermoplastic with a glass transition temperature (Tg) that is within 100° C. of the shell's glass transition temperature contributes to rigidity of the 3D-printed wafer. In some aspects, core and shell glass transition temperatures are within 50° C. of each other. In further aspects, core and shell thermoplastics are selected such that the core and shell glass transition temperature are within 15° C. of each other. The glass transition temperature measurement of the core and shell of the filament may be implemented as follows: the test method involves continuously monitoring the difference in heat flow into, or temperature between a reference material and a test material when they are heated or cooled at a controlled rate through the glass transition region of the test material and analyzing the resultant thermal curve to provide the glass transition temperature. A differential scanning calorimeter is employed and provides a rapid test method for determining changes in specific heat capacity in a homogeneous material. The glass transition is manifested as a step change in specific heat capacity. The differential scanning calorimeter (DSC) includes a Test Chamber composed of a furnace(s) to provide uniform controlled heating (cooling) of a specimen and reference to a constant temperature or at a constant rate over the temperature range from −120 to 500° C., a temperature sensor to provide an indication of the specimen temperature to ±0.1° C., differential sensors to detect heat flow difference between the specimen and reference with a sensitivity of 6 µW, a means of sustaining a test chamber environment of a purge gas of 10 to 100 mL/min within 4 mL/min, and a Temperature Controller capable of executing a specific temperature program by operating the furnace(s) between selected temperature limits at a rate of temperature change of up to 20° C./min constant to ±0.5° C./min. A Data Collection Device is employed to provide a means of acquiring, storing, and displaying measured or calculated signals, or both. The minimum output signals required for DSC are heat flow, temperature and time. Containers (pans, crucibles, vials, etc.) that are inert to the specimen and reference materials are employed. The containers are of suitable structural shape and integrity to contain the specimen and references. Nitrogen, or other inert purge gas supply, of purity equal to or greater than 99.9% is used as a purge gas. An analytical balance with a capacity greater than 100 mg, capable of weighing to the nearest 0.01 mg is employed. 5 to 20 mg of specimen is weighed on the analytical balance and used for analysis. If appropriate, an initial thermal program is performed and recorded in flowing nitrogen or air environment using a heating rate of 10° C./min to a temperature at least 20° C. above extrapolated end temperature Te (the point of intersection of the tangent drawn at the point of greatest slope on the transition curve with the extrapolated baseline following the transition) to remove any previous thermal history. Temperature is held until an equilibrium as indicated by the instrument response is achieved. Cooling is programmed at a rate of 20° C./min to 50° C. below the transition temperature of interest. Temperature is held until an equilibrium as indicated by the instrument response is achieved. Heating is repeated at same rate as in initial thermal program, and the heating curve is recorded until all desired transitions have been completed. Other heating rates may be used but must be reported. Temperatures Tm, Tf, or Ti are determined, where Ti is inflection temperature (the point on the thermal curve corresponding to the peak of the first derivative, with respect to time, of the parent thermal curve), Tf is extrapolated onset temperature (the point of intersection of the tangent drawn at the point of greatest slope on the transition curve with the extrapolated baseline) prior to the transition, and Tm is midpoint temperature (the point on the thermal curve corresponding to ½ the heat flow difference between the extrapolated onset and extrapolated end). The glass transition takes place over a temperature range and is known to be affected by time dependent phenomena, such as the rate of heating (cooling). For these reasons, the establishment of a single number for the glass transition needs some explanation. Either Tf or Tm or Ti may be selected to represent the temperature range over which the glass transition takes place. The particular temperature chosen must be agreed on by all parties concerned. In most cases, Tm is selected as the glass transition temperature Tg. This method is in accordance with ASTM E1356, Standard Test Method for Assignment of the Glass Transition Temperatures by Differential Scanning calorimetry.

Selecting a core thermoplastic with a flexural modulus that is within 3,000 MPa of the shell thermoplastic's flexural modulus also contributes to the wafer's rigidity and help it maintain its shape. In some embodiments, the core and shell flexural moduli are within 1,000 MPa of each other. In further embodiments, the core and shell thermoplastics are selected such that the core and shell flexural moduli are within 500 MPa of each other. The flexural moduli measurement of the core and—shell of the filament may be implemented as follows: a flexural or bend or flex test machine is used to determine flexural modulus. The machine should be operable at constant rates of crosshead motion in which the error in load measuring shall not exceed ±1% of the maximum load expected to be measured. The machine shall be equipped with a deflection measuring device. The stiffness of the testing machine shall be such that the total elastic deformation of the system does not exceed 1% of the total deflection of the test specimen during testing, or appropriate corrections shall be made. The load indicating mechanism shall be essentially free from inertial lag at the crosshead rate used. The loading nose and supports shall have cylindrical surfaces. In order to avoid excessive indentation, or failure due to stress concentration directly under the loading nose, the radii of the loading nose and supports shall be 5.0±0.1 mm [0.197±0.004 in.] unless otherwise specified or agreed upon between the interested parties. When other loading noses and supports are used they must comply with the following requirements: they shall have a minimum radius of 3.2 mm [⅛ in.] for all specimens, and for specimens 3.2 mm or greater in depth, the radius of the supports may be up to 1.6 times the specimen depth. They shall be this large if significant indentation or compressive failure occurs. The arc of the loading nose in contact with the specimen shall be sufficiently large to prevent contact of the specimen with the sides of the nose. The maximum radius of the loading nose shall be no more than 4 times the specimen depth. Suitable micrometers for measuring the width and thickness of the test specimen to an incremental discrimination of at least 0.025 mm [0.001 in.] should be used. All width and thickness measurements of rigid and semi-rigid plastics may be measured with a hand micrometer with ratchet. A suitable instrument for measuring the thickness of non-rigid test specimens shall have: a contact measuring pressure of 25±2.5 kPa [3.6±0.36 psi], a movable circular contact foot 6.35±0.025 mm [0.250±0.001 in.] in diameter and a lower fixed anvil large enough to extend beyond the contact foot in all directions and being parallel to the contact foot within 0.005 mm [0.002 in.] over the entire foot area. The specimens may be cut from sheets, plates, or molded shapes, or may be molded to the desired finished dimensions. For flatwise tests, the depth of the specimen shall be the thickness of the material. For edgewise tests, the width of the specimen shall be the thickness of the sheet, and the depth shall not exceed the width. For all tests, the support span shall be 16 (tolerance±1) times the depth of the beam. Specimen width shall not exceed one fourth of the support span for specimens greater than 3.2 mm [⅛ in.] in depth. Specimens 3.2 mm or less in depth shall be 12.7 mm [½ in.] in width. The specimen shall be long enough to allow for overhanging on each end of at least 10% of the support span, but in no case less than 6.4 mm [¼ in.] on each end. Overhang shall be sufficient to prevent the specimen from slipping through the supports. An exemplary specimen may measure 80±2 mm in length, 10±0.2 mm in width, and 4±0.2 mm in depth. At least five specimens are tested for each sample in the case of isotropic materials or molded specimens. The test specimens are conditioned at 23±2° C. [73.4±3.6° F.] and 50±5% relative humidity for not less than 40 hours prior to test. The tests are conducted at 23±2° C. [73.4±3.6° F.] and 50±5% relative humidity. An untested specimen is used for each measurement. The width and depth of the specimen are measured to the nearest 0.03 mm [0.001 in.] at the center of the support span. For specimens less than 2.54 mm [0.100 in.] in depth, the depth is measured to the nearest 0.003 mm [0.0005 in.]. The support span to be used is determined and the support span is set to within 1% of the determined value. The rate of crosshead motion is calculated as follows and the machine is set for the rate of crosshead motion as calculated by Eq 1:

$$R = ZL^2/6d \qquad (1)$$

where R is the rate of crosshead motion, mm L is support span, mm [in.], d is depth of beam, mm [in.], and Z is rate of straining of the outer fiber, mm/mm/min [in./in./min]. Z shall be equal to 0.01. The loading nose and supports are aligned so that the axes of the cylindrical surfaces are parallel and the loading nose is midway between the supports. The parallelism of the apparatus may be checked by means of a plate with parallel grooves into which the loading nose and supports will fit when properly aligned. The specimen is centered on the supports, with the long axis of the specimen perpendicular to the loading nose and supports. The load is applied to the specimen at the specified crosshead rate, and simultaneous load-deflection data are taken. Deflection is measured either by a gauge under the specimen in contact with it at the center of the support span, the gauge being mounted stationary relative to the specimen supports, or by measurement of the motion of the loading nose relative to the supports. Load-deflection curves may be plotted to determine the flexural strength, chord or secant modulus or the tangent modulus of elasticity, and the total work as measured by the area under the load-deflection curve. The necessary toe compensation is performed to correct for seating and indentation of the specimen and deflections in the machine. The test is terminated when the maximum strain in the outer surface of the test specimen has reached 0.05 mm/mm [in./in.] or at break if break occurs prior to reaching the maximum strain. The deflection at which this strain will occur may be calculated by letting r equal 0.05 mm/mm [in./in.] in Eq 2:

$$D=rL^2/6d \qquad (2)$$

where D is midspan deflection, mm [in.], r is strain mm/mm [in./in.], L is support span, mm [in.], and d is depth of beam, mm [in.]. When a homogeneous elastic material is tested in flexure as a simple beam supported at two points and loaded at the midpoint, the maximum stress in the outer surface of the test specimen occurs at the midpoint. This is flexural stress ($\sigma f$), and may be calculated for any point on the load-deflection curve by Eq 3:

$$\sigma f=3PL/2bd^2 \qquad (3)$$

where $\sigma f$ is stress in the outer fibers at midpoint, MPa [psi], P is load at a given point on the load-deflection curve, N [lbf], L is support span, mm [in.], b=width of beam tested, mm [in.], and d is depth of beam tested, mm [in.]. Flexural strain ($\varepsilon f$) is the nominal fractional change in the length of an element of the outer surface of the test specimen at midspan, where the maximum strain occurs. Flexural strain is calculated using Eq 4:

$$\varepsilon f=6Dd/L^2 \qquad (4)$$

where $\varepsilon f$ is strain in the outer surface, mm/mm [in./in.], D is the maximum deflection of the center of the beam, mm [in.], L is support span, mm [in.], and d is depth, mm [in.]. The flexural modulus is a function of flexural stress and flexural strain between 0.05% and 0.25% flexural strain, is reported in units of pressure, e.g., MPa, and can be calculated by the flexural test machine in accordance with ASTM D790, Standard Test Methods for Flexural Properties of Unreinforced and Reinforced Plastics and Electrical Insulating Materials.

The core and shell thermoplastics' functional groups may be selected to form connecting points and improve adhesion between deposited layers. The functional groups may be selected to form hydrogen bonds, ion-dipole interactions, ion-ion interactions, dipole-dipole interactions, charge transfer interactions, intermolecular interactions such as π-hydrogen bonding, n-π complex formation, π-π interaction, cross-linking, or physically bond to each other by van der Waals forces, interphase diffusion, or crystallization. An example of functional group hydrogen-bonding is the H-bond established between an amine's lone pair of electrons and a hydroxyl group's hydrogen atom. An example of functional group ionic bonding is a carboxylate and quaternary or protonated amine ion pair. An example of physical bonding arises from Van der Waal's forces within crystallized polymer chains. The net result of a deposited core-shell composite filament using thermoplastics selected using the criteria identified above is clear 3D-printed wafer of optical quality that exhibits exceptional adhesion to a base lens.

Some aspects of the disclosure are directed towards a core-shell filament for use in additive manufacturing of an ophthalmic lens. In some embodiments, the core-shell filament comprises an elongated core formed of a first thermoplastic material having a first refractive index, and a shell around the elongated core formed of a second thermoplastic material having a second refractive index, with the difference between the first and second refractive indices being equal to or less than 0.1. In some aspects, a preferred difference between the first and second refractive indices is equal to or less than 0.01, more preferably equal to or less than 0.001. In some aspects, the first thermoplastic material has a glass transition temperature that is within 100° C., preferably within 50° C., more preferably within 15° C. of the glass transition temperature of the second thermoplastic material. In some embodiments, the first thermoplastic material has a flexural modulus that within 3,000 MPa, preferably within 1,000 MPa, more preferably within 500 MPa of the flexural modulus of the second thermoplastic material. In some aspects, the core-shell filament is as defined in the claims.

The composite filament's component materials may include one or more additives. In some aspects, the core thermoplastic material includes at least one of a flow improver, a near infra-red absorber, and/or a plasticizer. In further aspects, the shell thermoplastic material includes at least one of a flow improver, a near infra-red absorber, a plasticizer, and/or a compatibilizer. The core and shell thermoplastic materials may include the same additives, or different additives. In some aspects, core and shell thermoplastic materials do not include additives.

The composite filament core may have a diameter ranging from 0.05 mm to 3.0 mm. The composite filament shell may have a thickness ranging from 0.05 mm to 3.0 mm. The composite filament total diameter ranges in size from 0.15 mm to 9.0 mm. In some embodiments, the composite filament first thermoplastic material and the composite filament second thermoplastic material are each selected from the group consisting of polyamides, polyesters, polyethylenes, polyethylene terephthalate, polysiloxanes, polyimides, polyetherimide, polyurethanes, polypropylenes, polypentene, polyetheretherketones, polyetherarylketones, perfluoroalkoxys, polychlorotrifluoroethylenes, polyolefinics such as cyclo olefin polymers, polyacrylics, polyacrylates such as polymethylmethacrylate, poly(meth)acrylate, polyethyl (meth)acrylate, polybutyl(meth)acrylate, and polyisobutyl (meth)acrylate, polythiourethanes, polycarbonates, polyallylics, polyphenylene sulfides, polyvinyls, polyarylenes, polyoxides, polysulfones, polyphenylsulfone, fluorinated ethylene propylenes, polytetrafluoroethylenes, ethylene-tetrafluoroethylenes, polyvinylidene fluorides, ethylene-chlororotifluoroethylenes, ionomers, ethylene methacrylic acid, polystyrenes, polyacrylonitriles, styrene copolymers such as styrene acrylonitrile, styrene methyl methacrylate, styrene butadiene methyl methacrylate, acrylonitrile butadiene styrene, methyl methacrylate acrylonitrile butadiene styrene, and styrene maleic anhydride, polyimides, polyetherimides, polypentenes, cellulose triacetate, copolymers thereof, and combinations thereof. Suitable polyamides include aliphatic nylon polyamides, such as nylon 6, nylon 6-6, nylon 6-10, nylon 6-12, nylon 10, nylon 10-10, nylon 11, nylon 12, a copolymer thereof, or a derivative or mixture thereof. Suitable polyethylenes include low-density polyethylene, medium-density polyethylene, high-density polyethylene, and combinations thereof. Suitable polypropylenes include isotactic polypropylenes, syndiotactic polypropylenes, branched and linear variations thereof, and combinations thereof. The first and second thermoplastic materials are selected to inter-diffuse into one another during the additive build-up process. Thermoplastic materials that inter-diffuse into one another are said to exhibit compatibility, or to be compatible with each other.

One or more additives may be added to the first and or second thermoplastic materials. The core and/or shell thermoplastic can be modified in order to improve inter-diffusing, and/or adhesion between layers. A plasticizer may be incorporated into the core and/or shell thermoplastic to provide tackiness and improve inter-diffusion. A flow improver may be incorporated into the core and/or shell thermoplastic to reduce viscosity and improve flow and inter-diffusion. A near infra-red absorber may be incorporated into the core and/or shell thermoplastic. Addition of a near infra-red absorber may be optionally combined with an infra-red heater to allow the theroplastic to absorb heat, decrease viscosity, and improve inter-diffusion. A compatibilizer may be incorporated into the core and/or shell thermoplastic to reduce interfacial tension. Compatibilizers are generally molecules with hydrophobic and hydrophilic regions that can be aligned along the interfaces between the two polymer phases, causing the interfacial tension to be reduced and the inter-diffusion between polymer blends to be increased. The core and/or shell thermoplastic may optionally include one or more light filters, such as blue cut, near infra-red cut, chrono cut, one or more UV absorbers, one or more heat stabilizers, one or more mold release agents, one or more hindered amine light stabilizers, or any combination of the foregoing. The composite filament disclosed above may be used to manufacture an ophthalmic lens component, for example, a base lens or a functional wafer.

Some aspects of the disclosure are directed to an additive manufacturing method for fabricating an ophthalmic lens. The method comprises feeding a first thermoplastic material having a first refractive index to a co-extrusion die, feeding a second thermoplastic material having a second refractive index to a co-extrusion die, co-extruding the first and second thermoplastic materials to produce a core-shell filament; and building up multiple voxels of co-extruded core-shell filament to fabricate the ophthalmic lens. In some aspects, adhesion between deposited filament voxels is at least 100 g/25 mm. The adhesion between deposited filament voxels may be determined by ASTM D1876-01. In some aspects, the method is as defined in the claims.

In some embodiments, the co-extruded core-shell filament comprises an elongated core formed of the first thermoplastic material and a shell around the elongated core formed of the second thermoplastic material. In some aspects, the first thermoplastic material has a glass transition temperature that is within 100° C., preferably within 50° C., more preferably within 15° C. of the glass transition temperature of the second thermoplastic material. In some aspects, the first thermoplastic material has a flexural modulus that is within 3,000 MPa, preferably within 1,000 MPa, more preferably within 500 MPa of the flexural modulus of the second thermoplastic material. At least one of the first thermoplastic material and the second thermoplastic material may include at least one of a flow improver, a near infra-red absorber, a plasticizer, light filter, UV absorber, heat stabilizer, mold release agent, and/or a hindered amine light stabilizer. Some aspects of the disclosure are directed to an optical article that employs the ophthalmic lens manufacturing method disclosed herein, such as an optical article comprising an ophthalmic lens obtained by the manufacturing method disclosed herein. In some aspects, the optical article is as defined in the claims.

Also disclosed herein is a method of selecting core and shell materials for a core-shell filament that exhibits exceptional intra-layer adhesion when built up by an additive manufacturing method, such as 3D printing.

The use of the word "a" or "an" when used in conjunction with the term "comprising" in the claims and/or the specification may mean "one," but it is also consistent with the meaning of "one or more," "at least one," and "one or more than one."

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%. The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes a composite core-shell filament for 3D printing ophthalmic articles comprising a first core thermoplastic and a second shell thermoplastic.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Figure 1:
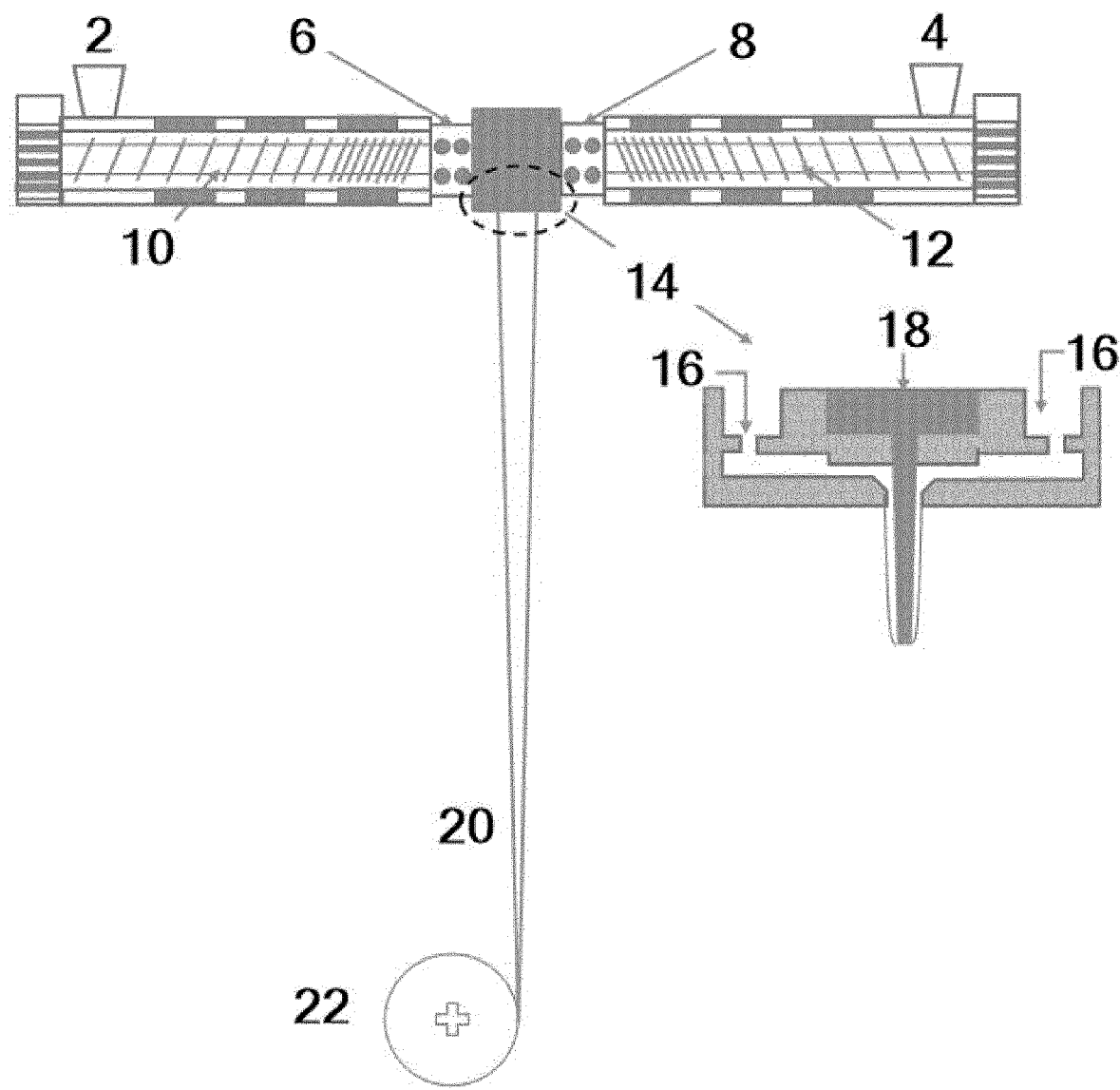
FIG. 1 is an illustration depicting a core-shell filament co-extrusion apparatus and process.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

"Ophthalmic lens," according to the disclosure, is defined as a lens adapted, namely for mounting in eyeglasses, whose function is to protect the eye and/or to correct vision. This lens can be an afocal, unifocal, bifocal, trifocal, or progressive lens. The ophthalmic lens may be corrective or un-corrective. Eyeglasses wherein ophthalmic lenses will be mounted could be either a traditional frame comprising two distinctive ophthalmic lenses, one for the right eye and one for the left eye, or like mask, visor, helmet sight or goggle, wherein one ophthalmic lens faces simultaneously the right and the left eyes. Ophthalmic lenses may be produced with traditional geometry as a circle or may be produced to be fitted to an intended frame.

Ophthalmic lenses manufactured in accordance with any of the methods of the invention can furthermore be functionalized, in a further step of optionally post-treating the lens, by adding at least a functional coating and/or a functional film. Functionalities may be added on one face of the ophthalmic lens, or on both faces of the ophthalmic lens, and on each face, the functionalities may be identical or different. The functionality can be, but is not limited to, impact-resistance, anti-abrasion, anti-soiling, anti-static, anti-reflective, anti-fog, anti-rain, self-healing, polarization, tint, photochromic, and selective wavelength filter which could be obtained through an absorption filter or reflective filter. Such selective wavelength filters are particularly useful for filtering ultra-violet radiation, blue light radiation, or infra-red radiation, for example. The functionality may be added by at least one process selected from dip-coating, spin-coating, spray-coating, vacuum deposition, transfer processes, or lamination processes. By transfer process it is understood that functionality is firstly constituted on a support like a carrier, and then is transferred from the carrier to the ophthalmic lens through an adhesive layer constituted between the two elements. Lamination is defined as obtaining a permanent contact between a film which comprises at least one functionality as disclosed herein and the surface of the ophthalmic lens to be treated, the permanent contact being obtained by the establishment of a contact between said film and the lens, followed optionally by a polymerization step or a heating step, in order to finalize the adhesion and adherence between the two entities. At the end of this lamination process the assembled film and the optical lens form one single entity. During the lamination process, an adhesive is used to laminate the interface of the film and the ophthalmic lens.

A wafer is defined as a structure that possesses particular desired optical attributes, e.g., selective light transmittance, reflectance or absorbance, polarization properties, color, photochromism, electrochromism, and the like. The wafer structure is produced by an additive manufacturing process. The process involves deposition of multiple filament voxels adhered, or otherwise secured, to each other.

The terms "core" and "shell" of a filament refer to relative locations of the portions along a cross-section of the filament that is orthogonal to a longitudinal length of the filament, where the core portion is an inner portion relative to the shell portion. Unless otherwise stated, these terms are not intended to imply any further limitations on the cross-sectional characteristics of the portions. The composite filament core may have a diameter ranging from 0.05 mm to 3.0 mm, or more particularly may be 0.05, 0.06, 0.07, 0.08, 0.09, 0.10, 1.5, 2.0, 2.1, 2.2, 2.3, 2.4, 2.5, 2.55, 2.6, 2.65, 2.7, 2.75, 2.8, 2.85, 2.9, 2.95, 3.0, and all diameters therein. The composite filament shell may have a thickness ranging from 0.05 mm to 3.0 mm, or more particularly may be 0.05, 0.06, 0.07, 0.08, 0.09, 0.10, 1.5, 2.0, 2.1, 2.2, 2.3, 2.4, 2.5, 2.55, 2.6, 2.65, 2.7, 2.75, 2.8, 2.85, 2.9, 2.95, 3.0, and all thicknesses therein. The composite filament diameter ranges in size from 0.15 mm to 9.0 mm.

As used herein, "Additive Manufacturing" means manufacturing technology as defined in the international standard ASTM 2792-12, describing a process of joining materials to make 3-D solid objects from a 3-D digital model. The process is referred to as "3-D printing" or "materials printing" since successive layers are laid down atop one another. Printing materials include liquids, powders, and sheet materials, from which series of cross-sectional layers are built. The layers, which correspond to the virtual cross sections from the CAD model, are joined or automatically fused to create the solid 3-D object. Additive Manufacturing includes, but is not limited to, manufacturing methods such as stereolithography, mask stereolithography, mask projection stereolithography, polymer jetting, scanning laser sintering (SLS), scanning laser melting (SLM), and fused deposition modelling (FDM). Additive Manufacturing technologies comprise processes which create 3-D solid objects by juxtaposition of volume elements or particles according to a pre-determined arrangement, typically defined in a CAD (Computer Aided Design) file. Juxtaposition is understood as sequential operations including building one material layer on top of a previously built material layer, and/or positioning a material volume element next to a previously deposited material volume element. The term "part" refers to any part built using a layer-based additive manufacturing technique, and includes 3D parts and support structures built using layer-based additive manufacturing techniques. Exemplary parts include, but are not limited to, wafers and lenses.

As used herein, "voxel" means a volume element. A voxel is a distinguishable, geometric shape which is part of a three-dimensional space. The size of a voxel is typically in the range of 0.1 to 500 μm for one dimension. "Voxel" can refer to an individual element which, in combination with other voxels, can define a line or a layer or other predetermined shape or pattern within the three-dimensional space. Constituted voxels can be any desired shape, depending on the technology and manufacturing process conditions used. A plurality or collection of adjacent voxels, when arranged, can create or define a line or layer and can constitute an optical element. A particular voxel may be identified by x, y, and z coordinates of a selected point of geometry of the shape, such as a corner, center, or by other means known in the art. The boundary of a voxel is defined by the outer surface of the voxel. Such boundaries may be in close proximity to, with or without contacting.

The term "polymer" refers to a polymeric material having one or more monomer species, including homopolymers, copolymers, terpolymers, and the like. As used herein, "thermoplastic" is understood to be a polymer resin that can melt when exposed to heat, and preferably is optically clear and of optical grade.

As used herein, "inter-diffuse," and derivatives, means movement of at least an ion, molecule, portion of a molecule, or portion of a polymer chain, from the space occupied by one voxel into the space occupied by a juxtaposed, physically contacting, voxel. Inter-diffusion can occur spontaneously or be induced by mechanical, physical, or chemical treatment. For example, a mechanical treatment includes agitation, such as by exposure to ultra-sonic energy, high-frequency vibratory device, etc., which promote mixing at the voxel boundaries. Macro-diffusion is a mechanical method wherein the voxels are blended or "smeared" by table vibrations, especially where such vibrations occur at the time of deposition, resulting in intimate voxel-to-voxel contact. An exemplary physical treatment includes a thermal treatment by exposure to heat, infra-red, microwave, etc., radiation. A thermal treatment increases temperature above the glass-liquid transition point (Tg) of the high viscosity domain in the voxels and promotes inter-diffusion. An exemplary chemical treatment includes a chemical reaction between reactive species of composition. The molecular mass of the polymers present in the voxels can be reduced, such as by two-pathway chemistries or reversible reactions, to promote inter-diffusion.

It is an object of the present disclosure to provide a composite core-shell filament material for additive manufacturing optical lenses having high clarity and mechanical strength. In some embodiments, the additive manufacturing method is fused deposition modeling. The composite core-shell filament material improves inter-diffusion and adhesion between deposited filament layers. The composite filament includes a core thermoplastic and a shell thermoplastic having refractive indices that are within 0.1 of each other. The core and shell thermoplastics are selected based on their refractive indices, and optional selection criteria, including glass transition temperature, flexural modulus, compatibility, and thermoplastic functional group. The resulting improvements in diffusability, inter-layer adhesion, and light propagation make the composite core-shell filaments disclosed herein attractive building blocks for fused deposition modeling.

In general, the compatibility between thermoplastic (polymer) phases determines the properties of a heterogeneous polymer blend. The interface between the polymer phases in a polymer system is characterized by the interfacial tension. If there are strong interactions between the phases then the polymer blend will be miscible in nature. Polymer molecular mass, architecture (degrees of branching), and the chemical nature of side chains contribute to compatibility between different polymers. Existing methods known to those of skill in the art may be used to predict or calculate polymer compatibility. For example, Polymer Science Series A, March 2015, Volume 57, Issue 2, pages 186-199 describes methods for assessing polymer compatibility. The methods include, but are not limited to, rheological measurements, nuclear magnetic resonance (NMR) spectroscopy, transmission electron microscopy (TEM), and small angle scattering.

Examples

Core-Shell Structured Filament Extrusion Process

The filament extrusion apparatus and process is shown in FIG. 1. Core thermoplastic is loaded into hopper A 2 and a shell thermoplastic loaded into a hopper B 4. The core thermoplastic hopper feeds a core material extruder 10 and the shell thermoplastic hopper feeds a shell material extruder 12. In each extruder, the respective thermoplastic material travels through multiple extrusion and/or temperature zones. Upon exiting the extruder, the extruded thermoplastic are passed through melt pumps 6 and 8. The core thermoplastic 18 and shell thermoplastic 16 are then passed through spinning head 14 to produce composite core-shell filament 20. The composite core-shell filament is wound up and collected by winder 22. The filament diameter can be adjusted by adjusting the melt pump volume flowrate and winding speed ratio. The core diameter and shell thickness may each be independently varied by adjusting the respective thermoplastic extrusion rate.

FDM 3D Printing Process

Figure 2:
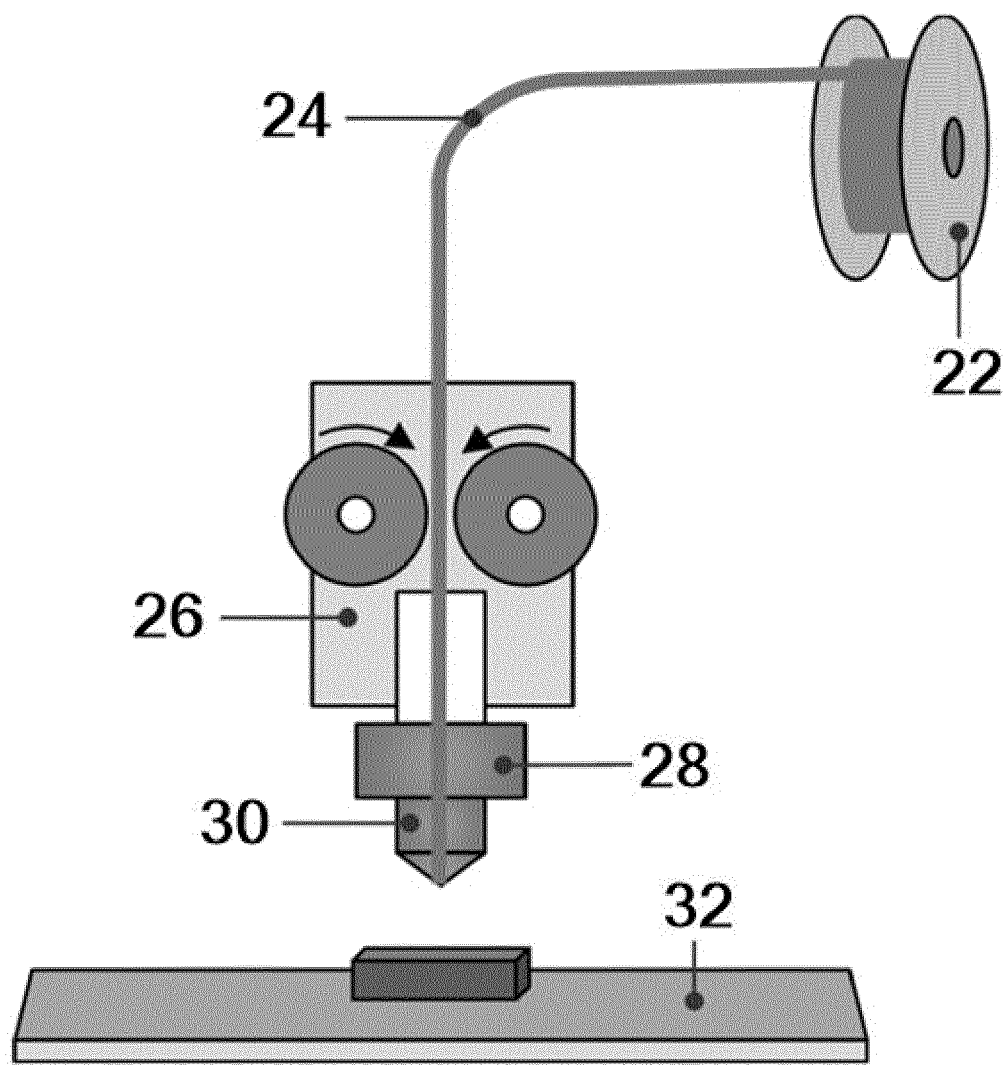
FIG. 2 is a diagram depicting an FDM 3D-printing apparatus and process.

An exemplary FDM 3D-printing process is shown in FIG. 2. A 3D computer-aided design (CAD) model is converted into standard triangulation language (STL) format. This is followed by virtually slicing the virtual part into thin horizontal layers, which are approximately 100 µm height along the Z-axis (vertical). The FDM apparatus then takes the STL virtual part instructions and builds up a part by adding filament that corresponds to the virtual layers. Generally, the filament 24 is fed to extruder 26, which includes heater block 28 and heated nozzle 30. The melted filament is delivered through the heated nozzle 30 onto a printing bed 32. The melted filament is applied on the X-Y plane to produce the first layer. Once first layer is complete, the platform is lowered along the Z-axis direction and a second layer is then printed. The above steps are repeated till the part is manufactured. The hot strands weld to one another to form a solid part.

The examples included in the tables below examine various filamentous combinations of core and shell thermoplastics. The examples included in Tables 5 and 6 include one or more additives. Abbreviations: polycarbonate=PC; thermoplastic urethane=TPU; polyamide=PA. Core and shell combinations are not limited to the combinations disclosed below. As discussed above, the c ore and shell combination selection criteria include a refractive index difference of 0.1 or less, and optionally, additional criteria including Tg, flexural modulus, and polymer compatibility. These parameters are included in the tables below, along with observations and results.

TABLE 1

Example 1: PC/TPU

|   | TP | Grade | RI | Tg | Flexural Modulus | Observations/results |
|---|---|---|---|---|---|---|
| Core | PC | Sabic Lexan OQ3820 | 1.59 | 150° C. | 2350 MPa | 1. Matched RI between core and shell. |
| Shell | TPU | Lubrizol VSN 2000 | 1.60 | 90° C. | 2206 MPa | 2. PC and TPU exhibit good compatibility.
3. TPU shell layers could be easily diffused due to low Tg and adhered together due to —NH—COO— functional groups. |

TABLE 2

Example 2: PC/PA

|   | TP | Grade | RI | Tg | Observations/results |
|---|---|---|---|---|---|
| Core | PC | Sabic Lexan OQ3820 | 1.59 | 150° C. | 1. Matched RI between core and shell. |
| Shell | PA | Evonik Trogamid A4100 | 1.59 | 130° C. | 2. PC and PA has good compatibility.
3. PA shell could be easily diffused due its lower Tg and better adhered due to —NH—CO— functional groups. |

TABLE 3

Example 3: PC/Copolyester

|   | TP | Grade | RI | Tg | Modulus (Flexural) | Observations/results |
|---|---|---|---|---|---|---|
| Core | PC | Sabic Lexan OQ3820 | 1.59 | 150° C. | 2350 MPa | 1. Matched RI between core and shell. |
| Shell | Copolyester | Eastman Tritan VX351 HF | 1.57 | 103° C. | 1575 MPa | 2. PC and copolyester exhibit good compatibility.
3. Copolyester shell could be diffused easily due to low Tg and modulus. |

TABLE 4

Example 4: PC/PC

|   | TP | Grade | RI | MFI* | Observations/results |
|---|---|---|---|---|---|
| Core | PC | Sabic Lexan OQ3820 | 1.59 | 7.4 | 1. Same RI between core and shell. |
| Shell | PC | Sabic Lexan OQ3120 | 1.59 | 25 | 2. PC shell layer has lower viscosity and can readily diffuse into PC core layer. |

*MFI—melt flow index (g/10 min)

TABLE 5

Example 5: PC/PC

|   | TP | Grade | Filter/additive | Observations/results |
|---|---|---|---|---|
| Core | PC | Sabic Lexan OQ3820 | None | 1. Same RI between core and shell. |
| Shell | PC | Sabic Lexan OQ3820 | NIR filter (Epolight 4831) | 2. PC shell layer includes NIR filter and remains at higher temperature under IR heater. This assists in core-shell inter-diffusion. |

TABLE 6

Example 6: PC/PC

|   | TP | Grade | Filter/additive | Observations/results |
|---|---|---|---|---|
| Core | PC | Sabic Lexan OQ3820 | None | 1. Same RI between core and shell. |
| Shell | PC | Sabic Lexan OQ3820 | Flow improver (MF-11) | 2. Shell layer has lower viscosity due to flow improver. This assists in core-shell inter-diffusion. |

Table 7 below includes extrusion temperatures used for Examples 1-6 above.

TABLE 7

| | Filament component extrusion temperatures | | | |
|---|---|---|---|---|
| Example | Core filament extrusion temp. Range | | Shell filament extrusion temp. range | |
| 1 | PC | 230-330° C. | TPU | 200-300° C. |
| 2 | PC | 230-330° C. | PA | 260-330° C. |
| 3 | PC | 230-330° C. | Copolyester | 240-300° C. |
| 4 | PC | 230-330° C. | PC-high MI | 200-300° C. |
| 5 | PC | 230-330° C. | PC + NIR | 230-330° C. |
| 6 | PC | 230-330° C. | PC + MF | 230-330° C. |

The claims are not to be interpreted as including means-plus- or step-plus-function limitations, unless such a limitation is explicitly recited in a given claim using the phrase(s) "means for" or "step for," respectively.

The invention claimed is:

1. An additive manufacturing method for fabricating an ophthalmic lens comprising:
    feeding a first thermoplastic material having a first refractive index to a co-extrusion die;
    feeding a second thermoplastic material having a second refractive index to a co-extrusion die;
    co-extruding the first and second thermoplastic materials to produce a core-shell filament; and
    building up multiple voxels of co-extruded core-shell filament to fabricate the ophthalmic lens;
    wherein a difference between the first refractive index and the second refractive index is equal to or less than 0.1.

2. The method of claim 1, wherein the co-extruded core-shell filament comprises an elongated core formed of the first thermoplastic material and a shell around the elongated core formed of the second thermoplastic material.

3. The method of claim 1, wherein the first thermoplastic material has a glass transition temperature that is within 100° C. of the second thermoplastic material glass transition temperature.

4. The method of claim 1, wherein the first thermoplastic material has a flexural modulus that is within 3,000 MPa of the second thermoplastic material flexural modulus.

5. The method of claim 1, wherein at least one of the first thermoplastic material and the second thermoplastic material further comprises at least one of a flow improver, a near infra-red absorber, a plasticizer, and a compatibilizer.

6. The method of claim 1, wherein adhesion between deposited filament voxels is at least 100 g/25 mm.

7. The method of claim 1, wherein at least one of the first thermoplastic material and second thermoplastic material further comprises at least one or more of a flow improver, a plasticizer, and a compatibilizer.

* * * * *